(12) United States Patent
Feng et al.

(10) Patent No.: US 10,999,236 B2
(45) Date of Patent: May 4, 2021

(54) SELECTION OF SERVICE PROVIDERS FOR MESSAGE TRANSMISSION ON ONLINE SOCIAL NETWORKS

(71) Applicant: Facebook, Inc., Menlo Park, CA (US)

(72) Inventors: Jin Feng, Fremont, CA (US); Jacobus Petrus van der Merwe, Redwood City, CA (US); Guillermo Martin Spiller Schimmel, Redwood City, CA (US); Yiran Zhang, Sunnyvale, CA (US); Zahan Jagdish Malkani, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 733 days.

(21) Appl. No.: 15/185,647

(22) Filed: Jun. 17, 2016

(65) Prior Publication Data

US 2017/0366497 A1    Dec. 21, 2017

(51) Int. Cl.
*H04L 12/58* (2006.01)
*H04L 12/66* (2006.01)
(Continued)

(52) U.S. Cl.
CPC .......... *H04L 51/32* (2013.01); *H04L 12/1442* (2013.01); *H04L 12/66* (2013.01); *H04L 41/5016* (2013.01); *H04L 41/5032* (2013.01); *H04L 43/16* (2013.01); *H04L 51/20* (2013.01); *H04L 67/02* (2013.01); *H04L 67/20* (2013.01);
(Continued)

(58) Field of Classification Search
CPC ......... H04L 51/32; H04L 51/20; H04L 43/08; H04L 43/50; H04L 51/30; H04L 12/1442; H04L 67/02; H04L 43/16; H04L 67/20; H04L 43/045; H04L 12/66; H04L 67/10; H04W 4/12; H04W 4/025; H05K 999/99
See application file for complete search history.

(56) References Cited

U.S. PATENT DOCUMENTS

| 9,246,828 B1 * | 1/2016 | Tagore | H04L 47/11 |
| 2004/0006601 A1 * | 1/2004 | Bernstein | H04L 51/30 |
| | | | 709/207 |

(Continued)

*Primary Examiner* — Hitesh Patel
*Assistant Examiner* — Clifton Houston
(74) *Attorney, Agent, or Firm* — Baker Botts L.L.P.

(57) ABSTRACT

In one embodiment, a method includes identifying a mobile service provider network (SPN) and a geographic location of an online social network user and accessing a service-provider table associated with the identified mobile SPN and with the geographic location. The service-provider table indexes a reliability score and a sampling amount for multiple messaging-service providers in the geographic location. The method further determines, based on the service-provider table, whether any of the messaging-service providers has a sampling amount below a threshold sampling amount and sends messaging traffic via the determined messaging-service provider until the sampling amount is greater than or equal to the threshold sampling amount. The messaging traffic is used to update the reliability score for the messaging-service provider. The method further includes selecting a messaging-service provider based on the updated reliability scores of the messaging-service providers and sending a message to the user via the selected messaging service-provider.

21 Claims, 6 Drawing Sheets

(51) Int. Cl.
*H04L 12/26* (2006.01)
*H04L 12/14* (2006.01)
*H04L 29/08* (2006.01)
*H04W 4/12* (2009.01)
*H04W 4/02* (2018.01)
*H04M 15/00* (2006.01)
*H04L 12/24* (2006.01)
*H04W 4/24* (2018.01)

(52) U.S. Cl.
CPC ........... *H04M 15/70* (2013.01); *H04M 15/74* (2013.01); *H04M 15/8038* (2013.01); *H04W 4/025* (2013.01); *H04W 4/12* (2013.01); *H04W 4/24* (2013.01); *H04L 41/5093* (2013.01); *H04L 51/30* (2013.01)

(56) References Cited

U.S. PATENT DOCUMENTS

| | | | | |
|---|---|---|---|---|
| 2004/0198360 A1* | 10/2004 | Kotzin | ............... | H04W 48/18 455/445 |
| 2009/0011765 A1* | 1/2009 | Inoue | ............... | H04W 72/0413 455/436 |
| 2009/0049173 A1* | 2/2009 | Pulito | ............... | H04L 41/00 709/226 |
| 2010/0205100 A1* | 8/2010 | Hurley | ............... | G06Q 30/06 705/80 |
| 2011/0178820 A1* | 7/2011 | Soni | ............... | G16H 50/20 705/3 |
| 2013/0148519 A1* | 6/2013 | Yu | ............... | H04W 24/06 370/252 |
| 2013/0275530 A1* | 10/2013 | Matson | ............... | H04L 51/24 709/206 |
| 2013/0333030 A1* | 12/2013 | Farris | ............... | H04L 63/126 726/22 |
| 2013/0336167 A1* | 12/2013 | Vadlakonda | ............... | H04L 45/04 370/255 |
| 2014/0173112 A1* | 6/2014 | Seago | ............... | H04L 67/32 709/226 |
| 2014/0201296 A1* | 7/2014 | Patfield | ............... | G06Q 10/10 709/206 |
| 2014/0376403 A1* | 12/2014 | Shao | ............... | H04L 67/02 370/254 |
| 2015/0081903 A1* | 3/2015 | Molinero Fernandez | ............... | H04M 15/66 709/225 |
| 2015/0117313 A1* | 4/2015 | Ranta-Aho | ............... | H04L 47/32 370/328 |
| 2015/0141063 A1* | 5/2015 | Lawless | ............... | H04W 4/18 455/466 |
| 2015/0248455 A1* | 9/2015 | Sevilla | ............... | G06F 16/22 707/736 |
| 2015/0373579 A1* | 12/2015 | Xu | ............... | H04W 48/16 370/230 |
| 2016/0105847 A1* | 4/2016 | Smith | ............... | H04W 52/0206 370/252 |
| 2016/0164824 A1* | 6/2016 | Kalyanaraman | ............... | H04W 4/14 709/206 |
| 2016/0173701 A1* | 6/2016 | Rasiwasia | ............... | H04M 15/53 455/406 |
| 2016/0182298 A1* | 6/2016 | Brooks | ............... | H04L 67/1012 709/206 |
| 2016/0192312 A1* | 6/2016 | Lambert | ............... | H04W 48/18 455/435.2 |
| 2017/0366362 A1* | 12/2017 | Sakai | ............... | H04L 12/189 |
| 2018/0219808 A1* | 8/2018 | Wala | ............... | G06F 3/04847 |

* cited by examiner

TIER 1 (Free Messaging)

| Messaging-Service Provider | Sampling Amount | Reliability score | Cost |
|---|---|---|---|
| ABC Networks | 90 | .90 | $0.00 |
| DEF Network | 92 | 0.87 | $0.00 |
| Foo Messaging | 20 | 0.85 | $0.00 |

TIER 2 ($0.01-0.05)

| Messaging-Service Provider | Sampling Amount | Reliability score | Cost |
|---|---|---|---|
| Bar Networks | 91 | 0.97 | $0.03 |
| Hello Messaging | 100 | 0.96 | $0.04 |
| World Messaging | 90 | 0.94 | $0.02 |

TIER 3 ($0.06-0.10)

| Messaging-Service Provider | Sampling Amount | Reliability score | Cost |
|---|---|---|---|
| Orange Networks | 100 | 0.99 | $0.10 |
| Blue Networks | 85 | 0.98 | $0.06 |
| Grape Messaging | 92 | 0.98 | $0.07 |

*FIG. 3*

TIER 1 (Free Messaging)

| SPN | Sampling Amount | Reliability score | Cost |
|---|---|---|---|
| ABC Networks | 100 | .90 | $0.00 |
| DEE Network | 100 | 0.87 | $0.00 |
| Foo Messaging | 100 | 0.85 | $0.00 |

TIER 2 ($0.01-0.05)

| SPN | Sampling Amount | Reliability score | Cost |
|---|---|---|---|
| Bar Networks | 100 | 0.97 | $0.03 |
| Hello Messaging | 100 | 0.95 | $0.04 |
| World Messaging | 100 | 0.92 | $0.02 |

TIER 3 ($0.06-0.10)

| SPN | Sampling Amount | Reliability score | Cost |
|---|---|---|---|
| Orange Networks | 100 | 0.99 | $0.10 |
| Blue Networks | 100 | 0.98 | $0.06 |
| Grape Messaging | 100 | 0.97 | $0.07 |

SELECTION OF SERVICE PROVIDERS FOR MESSAGE TRANSMISSION ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the social-networking system may select messaging-service providers for sending messages to users based on a user's location and service provider network, and further based on the messaging-service providers' reliability and costs. The social-networking system may need to send messages to users for various reasons. As an example and not by way of limitation, the social-networking system 160 may request that a user confirm ownership of a phone, as part of a two-step authentication process. When a user logs into the social-networking system from a new mobile device for the first time, the social-networking system may send a message containing a link or code that the user must use to confirm that the user has possession of the mobile device. When a social-networking system sends messages to users, it may select from a variety of messaging-service providers to route and deliver the message. As an example and not by way of limitation, a messaging-service provider may be an SMS gateway that routes SMS messages from the social-networking system to a user's mobile device. However, sometimes the messages may fail to reach their destination due to errors, failures, system congestion, etc. Since the social-networking system can choose the messaging-service provider, the social-networking system may select the provider in a manner that increases the likelihood of a successful transmission while balancing that against cost considerations (e.g., using the least expensive route that provides a sufficient likelihood of success).

In particular embodiments, the social-networking system may identify a mobile service provider network (SPN) of a user of an online social network and a geographic location of the user and may access a service-provider table associated with the identified mobile SPN for the geographic location. The service-provider table may index a reliability score and a sampling amount for each of a plurality of messaging-service providers in the geographic location. The social-networking system may then determine, based on the service-provider table, whether one or more of the messaging-service providers has a sampling amount below a threshold sampling amount. The social-networking system may then send, for each messaging-service provider having a sampling amount below the threshold sampling amount, messaging traffic via the messaging-service provider until the sampling amount is greater than or equal to the threshold sampling amount. The messaging traffic may be used to update the reliability score for the messaging-service provider. In this manner, the social-networking system may obtain a threshold number of sample message transmission from each messaging-service provider, and thus ascertain their reliability. The social-networking system may then select a messaging-service provider from the plurality of messaging-service providers indexed in the service-provider table based on the updated reliability scores of the messaging-service providers and send a message to the user via the selected messaging service-provider.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
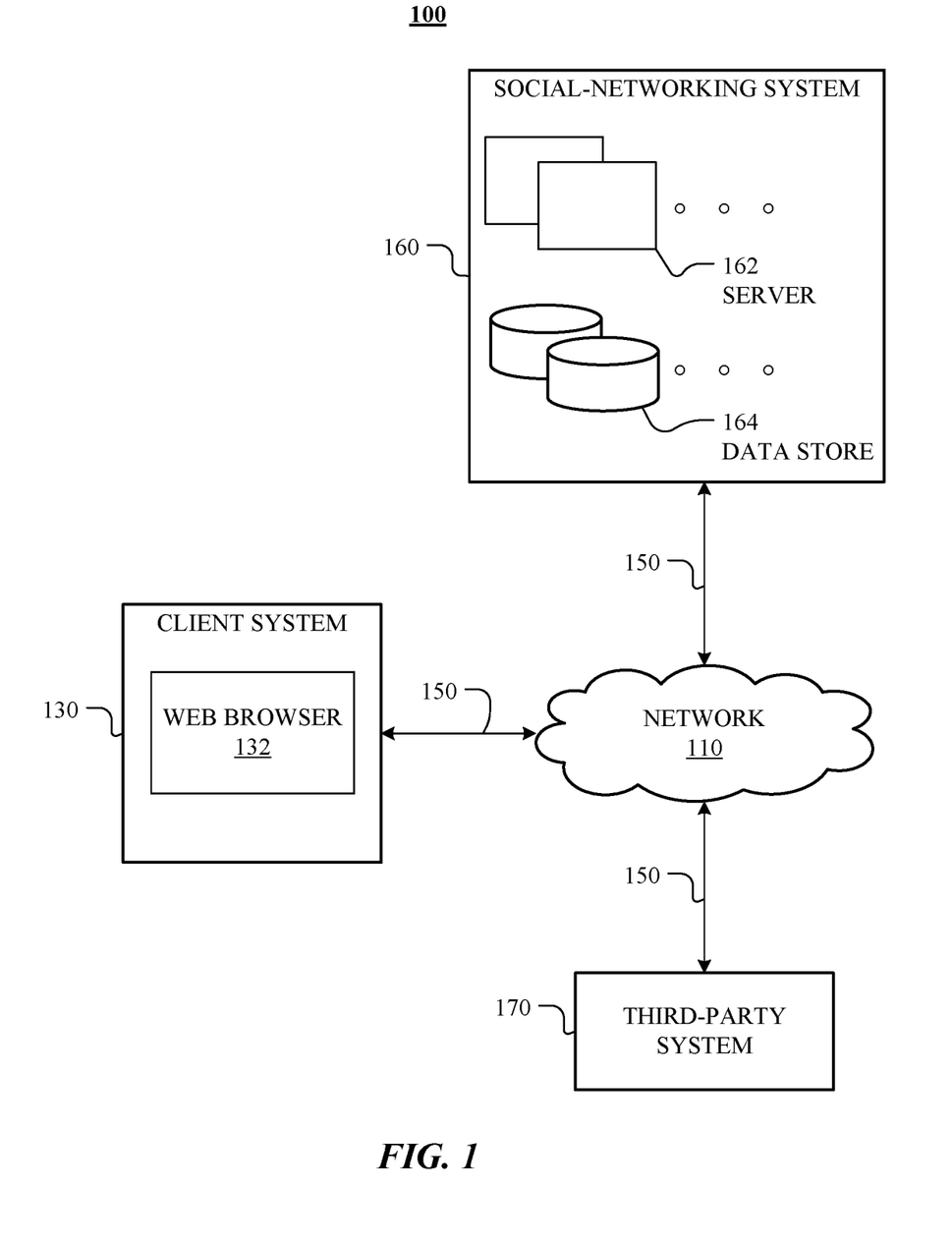
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Selection of Messaging-Service Providers

In particular embodiments, the social-networking system 160 may select messaging-service providers for sending messages to users based on a user's location and service provider network, and further based on the messaging-service providers' reliability and costs. The social-networking system 160 may need to send messages to users for various reasons. As an example and not by way of limitation, the social-networking system 160 may request that a user confirm ownership of a phone, as part of a two-step authentication process. When a user logs into the social-networking system from a new mobile device for the first time, the social-networking system may send a message containing a link or code that the user must use to confirm that the user has possession of the mobile device. When a social-networking system 160 sends messages to users, it may select from a variety of messaging-service providers to route and deliver the message. As an example and not by way of limitation, a messaging-service provider may be an SMS gateway that routes SMS messages from the social-networking system 160 to a user's mobile device. However, sometimes the messages may fail to reach their destination due to errors, failures, system congestion, etc. Since the social-networking system 160 can choose the messaging-service provider, the social-networking system 160 may select the provider in a manner that increases the likelihood of a successful transmission while balancing that against cost considerations (e.g., using the least expensive route that provides a sufficient likelihood of success).

Figure 2:
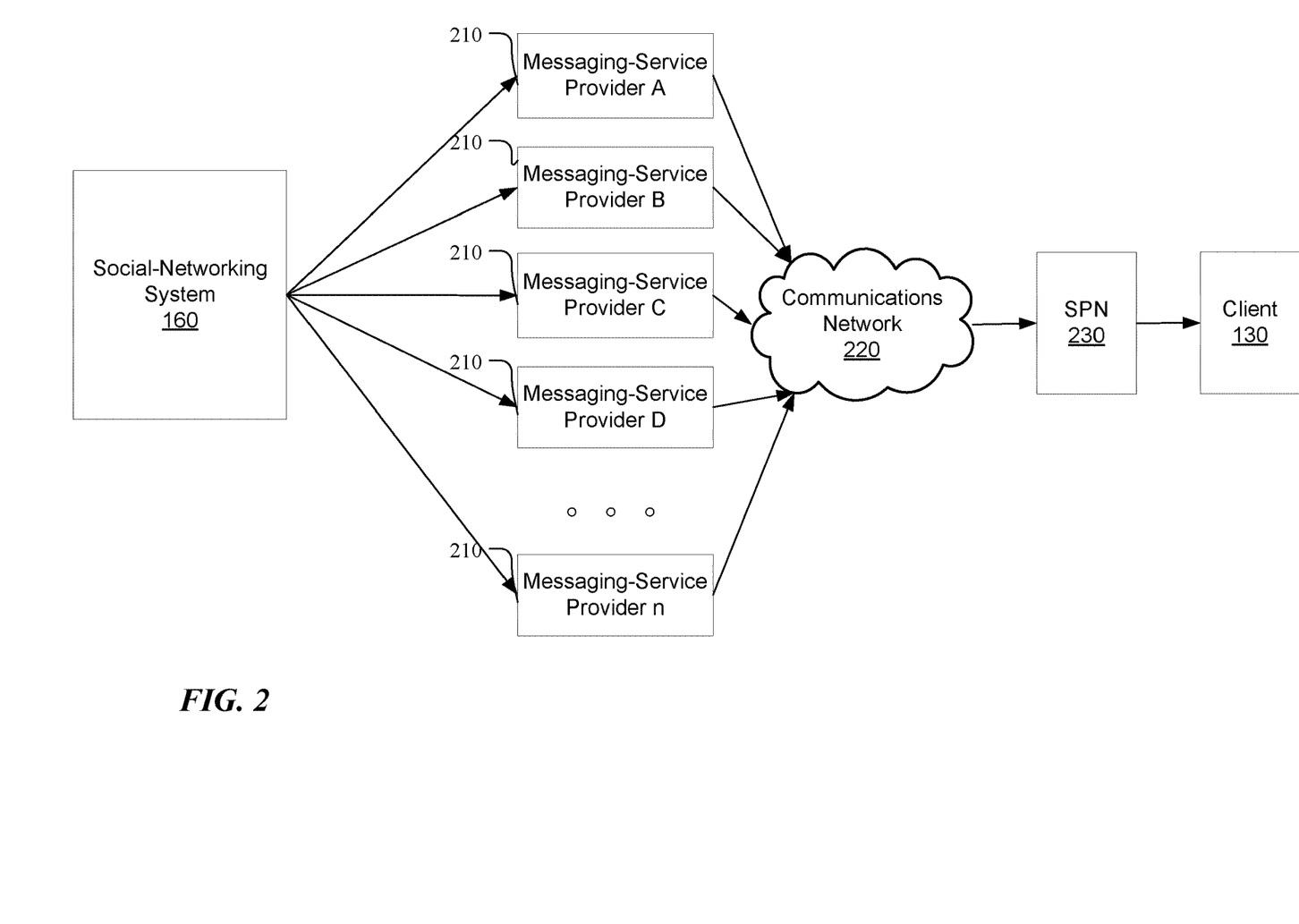
FIG. 2 illustrates an example network environment associated with the messaging-service providers used by the social-networking system to send messages.

In particular embodiments, the social-networking system 160 may identify a mobile service provider network (SPN) of a user of an online social network and a geographic location of the user. An SPN may be a provider of messaging or connectivity services for a user's mobile device, such as, for example, a mobile carrier (e.g., AT&T, Verizon, Sprint, T-Mobile). FIG. 2 illustrates an example network environment associated with the messaging-service providers used by the social-networking system to send messages. The social-networking system 160 may utilize any of various messaging-service providers 210 to send a message to client 130, which is connected to an SPN 230. As an example and not by way of limitation, the social-networking system 160 may identify that a user's mobile carrier is AT&T, and that the user is located in Canada. The social-networking system 160 may identify an SPN and geographic location using any suitable methods or systems such as, as an example and not by way of limitation, using user-provided information, device-provided information, SIM-card information, or social-graph information associated with the user. In connection with identifying a mobile SPN of a user of the online social network, particular embodiments may utilize one or more systems, components, elements, functions, methods, operations, or steps disclosed in U.S. patent application Ser. No. 13/922,144, filed 19 Jun. 2013, which is incorporated by reference. As another example and not by way of limitation, social-networking system 160 may identify a geographic location of the user by accessing location sensor data from the user's mobile device, or from an IP address of the user. Although this disclosure describes identifying an SPN and geographic location of the user in a particular manner, this disclosure contemplates identifying an SPN and geographic location of the user in any suitable manner.

Figure 3:
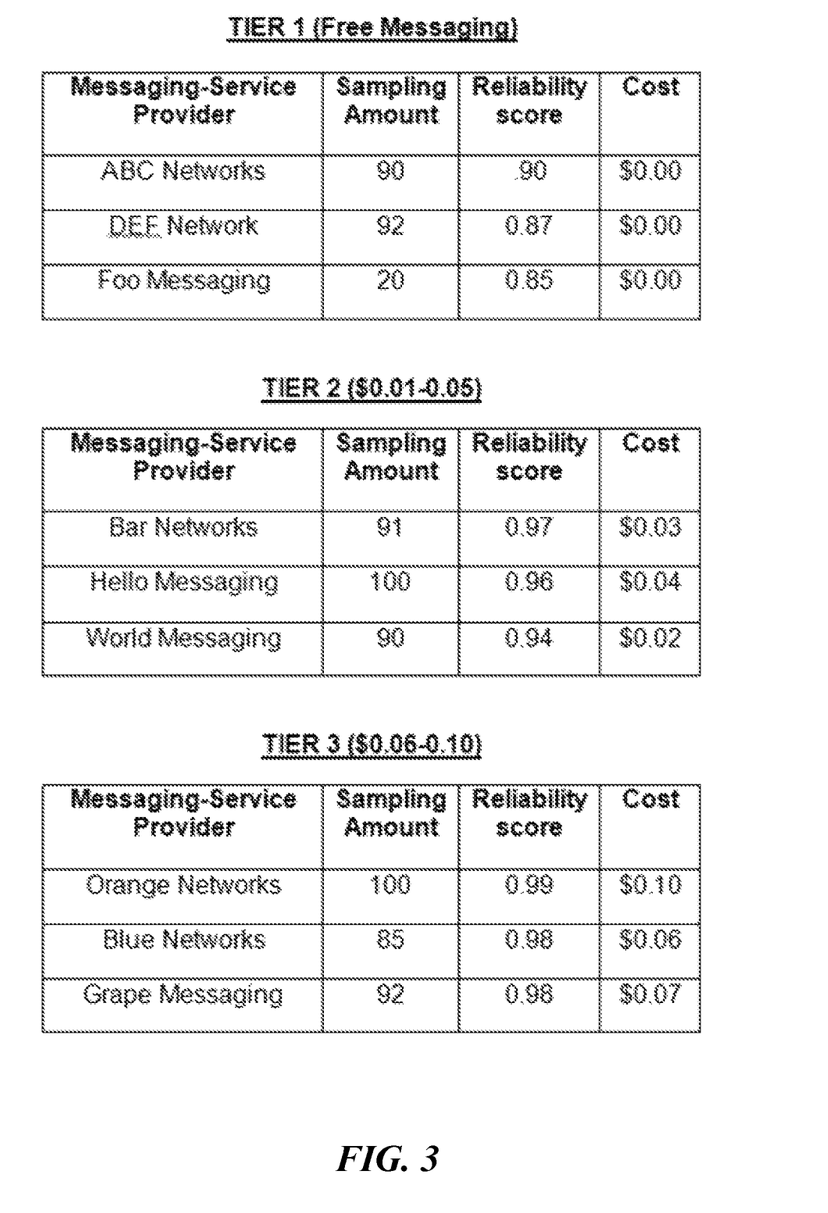
FIG. 3 illustrates an example tiered service-provider table based on ranges of costs.
Figure 4:
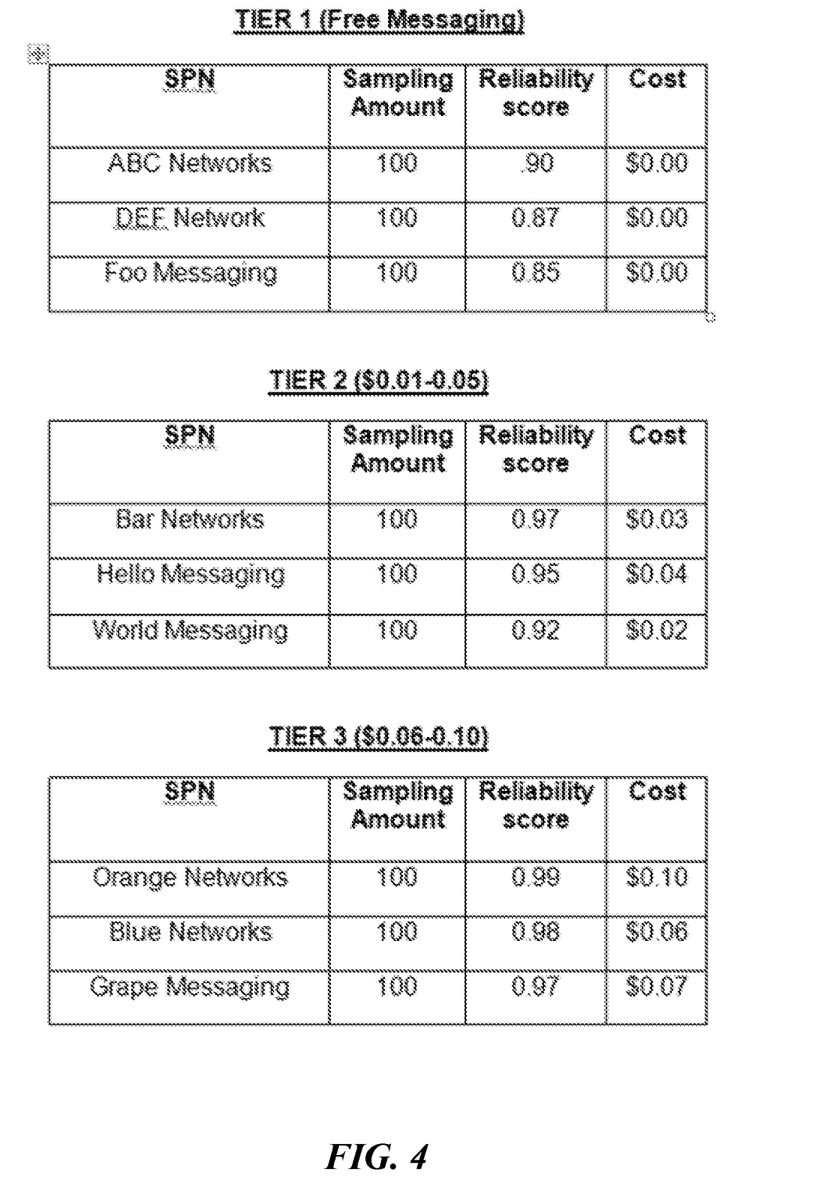
FIG. 4 illustrates an example tiered service-provider table based on ranges of costs.

In particular embodiments, the social-networking system 160 may access a service-provider table associated with the identified mobile SPN for the geographic location, wherein the service-provider table indexes a reliability score and a sampling amount for each of a plurality of messaging-service providers in the geographic location. FIGS. 3 and 4 illustrate example messaging-service provider tables. In particular embodiments, the social-networking system 160 may maintain indexed tables of available messaging-service providers for various geographic location and SPN pairs. A messaging-service provider may be any network or service suitable for transmitting messages to a user. In particular embodiments, the messaging service provider is an SMS gateway provider and the messages are short message service (SMS) messages. In particular embodiments, the messages may be multimedia messaging service (MMS) messages, push notifications, or voice messages. An SPN may be any service provider network that delivers messages to the user, such as, as an example and not by way of limitation, a mobile service carrier, an internet service provider, an email hosting service, etc. As an example and not by way of limitation, the social-networking system 160 may maintain separate messaging service-provider tables for AT&T and Canada, for Verizon and Canada, for AT&T and U.S. West Coast, for Verizon and U.S. West Coast, etc. Each of the service-provider tables may maintain reliability scores and sampling amounts for various messaging-service providers available for sending messages to users serviced by the corresponding SPN in the particular location. As an example and not by way of limitation, if Provider A, Provider B, and Provider C are available for sending messages to users connecting through AT&T in Canada, the social-networking system 160 may maintain tables listing a reliability score and sampling amount for each of Provider A, Provider B, and Provider C for messages sent to users connecting through AT&T in Canada. When preparing to send a message to a user, the social-networking system 160 may access the corresponding table to select a suitable messaging-service provider based on the user's SPN and geographic location. Although this disclosure describes accessing a service-provider indexing a reliability score and a sampling amount in a particular manner, this disclosure contemplates accessing a service-provider indexing a reliability score and a sampling amount in any suitable manner.

In particular embodiments, the social-networking system 160 may determine, based on the service-provider table, whether one or more of the messaging-service providers has a sampling amount below a threshold sampling amount. The sampling amount may be a count of how many messages have been sent through a messaging-service provider. A threshold sampling amount may be pre-assigned, for example, by a system administrator to reflect a number of samples that yields a sufficiently accurate reliability estimate. These sampling amounts may be used during a "sampling phase" where various available messaging-service providers are used a number of times to obtain an assessment of their reliability. The social-networking system 160 may maintain sampling amounts to ensure that enough messages are sent through every messaging-service provider to have an accurate estimate of each provider's reliability. As an example and not by way of limitation, assuming a threshold sampling amount of one-hundred messages, before sending a message to a user, the social-networking system 160 may access the corresponding service-provider table and look for any messaging-service providers with a sampling amount that is less than one-hundred. Referencing the example service-provider table 402 of FIG. 4, the social-networking system 160 may identify DEF Network and Foo Messaging as having a sampling amount less than one-hundred. The social-networking system 160 may then select either DEF Network or Foo Messaging to transmit the message. By ensuring a predetermined amount of messages is sent through each messaging-service provider, the social-networking system 160 may be able to gather sufficient data samples to determine which is the best provider to use to send messages to users associated with particular SPNs and locations. In this manner, the social-networking system 160 may be able to test provider reliability using actual traffic instead of test traffic. This may be useful in situations where the social-networking system 160 may not be able to send test traffic, such as, as an example and not by way of limitation, when testing SMS message reliability across multiple geographic regions and mobile service carriers. Although this disclosure describes determining whether a messaging-service provider has a sampling amount below a threshold sampling amount in a particular manner, this disclosure contemplates determining whether a messaging-service provider has a sampling amount below a threshold sampling amount in any suitable manner.

In particular embodiments, the sampling amount comprises a number of messages sent through the corresponding messaging-service provider since the beginning of a regular interval of time. As an example and not by way of limitation, the sampling amount may represent a number of messages sent through the messaging-service provider during the present day or in the last 24 hours. In particular embodiments, the sampling amount is reset at the end of the regular interval of time. As an example and not by way of limitation, the sampling amounts may be reset at the end of each day. In this manner, the social-networking system would obtain updated samples for reliability measurements every day.

In particular embodiments, the social-networking system 160 may send, for each messaging-service provider having a sampling amount below the threshold sampling amount, messaging traffic via the messaging-service provider until the sampling amount is greater than or equal to the threshold sampling amount. The messaging traffic may be used to update the reliability score for the messaging-service provider. As an example and not by way of limitation, before sending a message to a user, the social-networking system 160 may determine if any of the available messaging-service providers has a sampling amount below the threshold (e.g., sampling amount is fifty and the threshold is one-hundred), and when it finds one it may send the message through the identified messaging-service provider. In particular embodiments, the reliability score may be a ratio of a number of messages that were successfully delivered to their destinations via the messaging-service provider divided by a total number of messages that were sent via the messaging-service provider. As an example and not by way of limitation, a messaging-service provider over which forty-five out of fifty messages have reached their destination would have a reliability score of 45/50=0.900. If the message was successfully delivered, the social-networking system 160 may add one to the number of messages that were successfully delivered, update the sampling amount for the provider to fifty-one, and update the reliability score for the provider to 46/51=0.902. Although this disclosure describes sending messaging traffic and updating a sampling amount and reliability score in a particular manner, this disclosure contemplates sending messaging traffic and updating a sampling amount and reliability score in any suitable manner.

In particular embodiments, the messaging traffic sent through the messaging-service providers comprises SMS messages, multimedia messaging service (MMS) messages, push notifications, voice messages, or any other message-types suitable for the social-networking system 160 to send notifications to its users. As an example and not by way of limitation, the messaging traffic may include any notifications regarding social-networking activity, such as friend requests, post notifications, tag notifications, location notifications, etc. In particular embodiments, messaging traffic comprises request for confirmation of ownership of a device associated with an account of the user on the online social network. As an example and not by way of limitation, when a user logs into the social-networking system 160 from a new mobile device, the social-networking system 160 may send the user an SMS message with information to confirm that the user has ownership of the device (e.g., "enter the code 2345 on the Facebook App"). In particular embodiment, the request comprises a hyperlink. As an example and not by way of limitation, the user may activate the hyperlink to confirm the account. Although this disclosure describes the social-networking system sending messages in a particular manner, this disclosure contemplates the social-networking system sending messages in any suitable manner.

In particular embodiments, the social-networking system 160 may select a messaging-service provider from the plurality of messaging-service providers indexed in the service-provider table based on the updated reliability scores of the messaging-service providers. In particular embodiments, the social-networking system 160 may select a messaging-service provider with a highest reliability score. In particular embodiments, the social-networking system 160 may select the messaging-service provider based on costs of sending messages via each of the plurality of messaging-service providers. As an example and not by way of limitation, the social-networking system 160 may select a messaging-service provider with a lower cost per message than another provider with a higher cost and similar reliability score. In particular embodiments, the service-provider table comprises a plurality of tiers, each tier comprising messaging-service providers within a range of costs. FIG. 3 illustrates an example tiered service-provider table based on ranges of costs. The example table in FIG. 4 shows sampling amounts and reliability scores determined before a sampling phase. In the FIG. 3 example, a first tier includes free providers, a second tier includes providers that cost between $0.01 and $0.05 per message, and a third tier includes providers that cost between $0.06 and $0.10 per message. In particular embodiments, the social-networking system 160 may assign a priority to each messaging-search provider of the plurality of messaging-service providers, wherein the priority is based on ordering the tiers by ascending cost and ordering the messaging-service providers within each tier by descending reliability score. As an example and not by way of limitation, FIG. 3 illustrates the ordering of the providers by both cost tiers and reliability scores. In particular embodiments, the social-networking system 160 selects the messaging-service provider with the highest priority. As an example and not by way of limitation, the social-networking system 160 may select the service providers as ordered in FIG. 3 from top to bottom when sending, or re-sending messages, as is further explained below. Although this disclosure describes selecting a messaging-service provider in a particular manner, this disclosure contemplates selecting a messaging-service provider in any suitable manner.

In particular embodiments, the social-networking system 160 may send a message to the user via the selected messaging service-provider. As an example and not by way of limitation, to send a message to user of the social-networking system 160, the social-networking system may first examine a priority table that corresponds to the user's geographic location and SPN. FIG. 4 illustrates an example tiered service-provider table based on ranges of costs. The example table in FIG. 4 shows sampling amounts and reliability scores determined after a sampling phase. If the social-networking system 160 determines that all available providers have been sufficiently sampled, the social-networking system 160 may select a service provider from the table, as explained above (e.g., a highest reliability provider, or a highest priority provider). As an example and not by way of limitation, the social-networking system 160 may select ABC Networks as the highest priority provider, and send the message to the user through ABC Networks. Although this disclosure describes sending messages through selected messaging-service providers in a particular manner, this disclosure contemplates sending messages through selected messaging-services provider in any suitable manner.

In particular embodiments, the social-networking system 160 determines that a particular message was successfully delivered when an action responsive to the particular message is detected. The social-networking system 160 may assume for purposes of sampling that a message was not successfully delivered to a recipient if no response message is received from the user. However, in particular embodiments, the recipient or the messaging-service provider may omit sending an explicit response to the message. As an example and not by way of limitation, the message may be an SMS message asking a user click on a link to confirm that the user has possession of a device being used to access a social-networking account (e.g., "Please confirm your device by visiting the link http://fb.com/2345abc"). When the user clicks on the link, the social-networking system 160 is informed, and therefore determines that the user has received the message. In particular embodiments, the social-networking system 160 determines that a particular message was not successfully delivered when a response to the particular message is not received before a pre-determined amount of time elapses. As an example and not by way of limitation, if the user does not click on the link within a particular amount of time, e.g., 5 minutes, the social-networking system 160 may assume that the user did not receive the message. As another example and not by way of limitation, the message may be an SMS messaging notifying a user that a friend has mentioned the user in a social-networking post. If the user then logs into the social-networking system 160 before a pre-determined amount of time elapses, the social-networking system may determine that the message was received. As another example and not by way of limitation, if the user performs an action in the social-networking system responsive to the message (e.g., post a comment, accept a friend request, etc.) within the pre-determined time period, the social-networking system may determine that the message was received. Actions responsive to a message may include any suitable social-networking activity such as, by way of example and not limitation, logging into the social-networking system, visiting a link included in the message, submitting "Likes", commenting on posts, posting to the social-networking system, submitting a "check-in," responding to a friend request, tagging an image, messaging a user of the social-networking system, accessing content on the social-networking system, etc. In particular embodiments, based on determining that the particular message was not successfully delivered, the social-networking system 160 may re-send the particular message via another messaging-service provider from the plurality of messaging-service providers based on the reliability scores of the messaging-service providers. After determining that a user did not receive a message during the "sampling phase," the social-networking system 160 may re-send the message through a another messaging-service provider based on reliability score, regardless of the sampling amounts. As an example and not by way of limitation, assuming the provider table of FIG. 3 is used and that a message sent through ABC Networks was not successfully delivered, the social-networking system 160 may choose the next highest-reliability provider, i.e., Orange Networks, to re-send the message despite it having a sampling amount that is not less than the threshold. In particular embodiments, the social-networking system 160 may determine that the message to the user was not successfully delivered to the user and may re-send the message to the user via another messaging-service provider with a next highest reliability score and a sampling amount that is greater than or equal to the threshold sampling amount. As an example and not by way of limitation, assuming the provider table of FIG. 3 is used and that a message sent through ABC Networks was not successfully delivered, the social-networking system 160 may choose the next highest-reliability provider with a sampling amount greater than or equal to the threshold of one-hundred messages (i.e., Hello Messaging) to re-send the message. In particular embodiments, the social-networking system 160 may determine that the message to the user was not successfully received by the user and re-send the message to the user via another messaging-service provider with a next highest priority. As an example and not by way of limitation, assuming the provider table of FIG. 3 is used and that a message sent through ABC Networks was not successfully delivered, the social-networking system may choose the next highest-priority provider (i.e., Hello Messaging), to re-send the message. Although this disclosure describes re-sending messages in a particular manner, this disclosure contemplates re-sending messages in any suitable manner.

In particular embodiments, the social-networking system 160 may periodically update the reliability score and the cost of each of the plurality of service providers in the service-provider table. The social-networking system 160 may then re-assign a priority to each of the plurality of service providers in the service-provider table based on these periodic updates. As an example and not by way of limitation, the social-networking system 160 may re-sample messaging-service providers to update the reliability measurements and may update the costs every day, every week, or after any suitable time period. As an example and not by way of limitation, the social-networking system 160 may reset the sampling amounts to zero after a time period in order to restart the sampling of the providers. Although this disclosure describes periodically updating the reliability scores and costs in a particular manner, this disclosure contemplates periodically updating the reliability scores and costs in any suitable manner.

Figure 5:
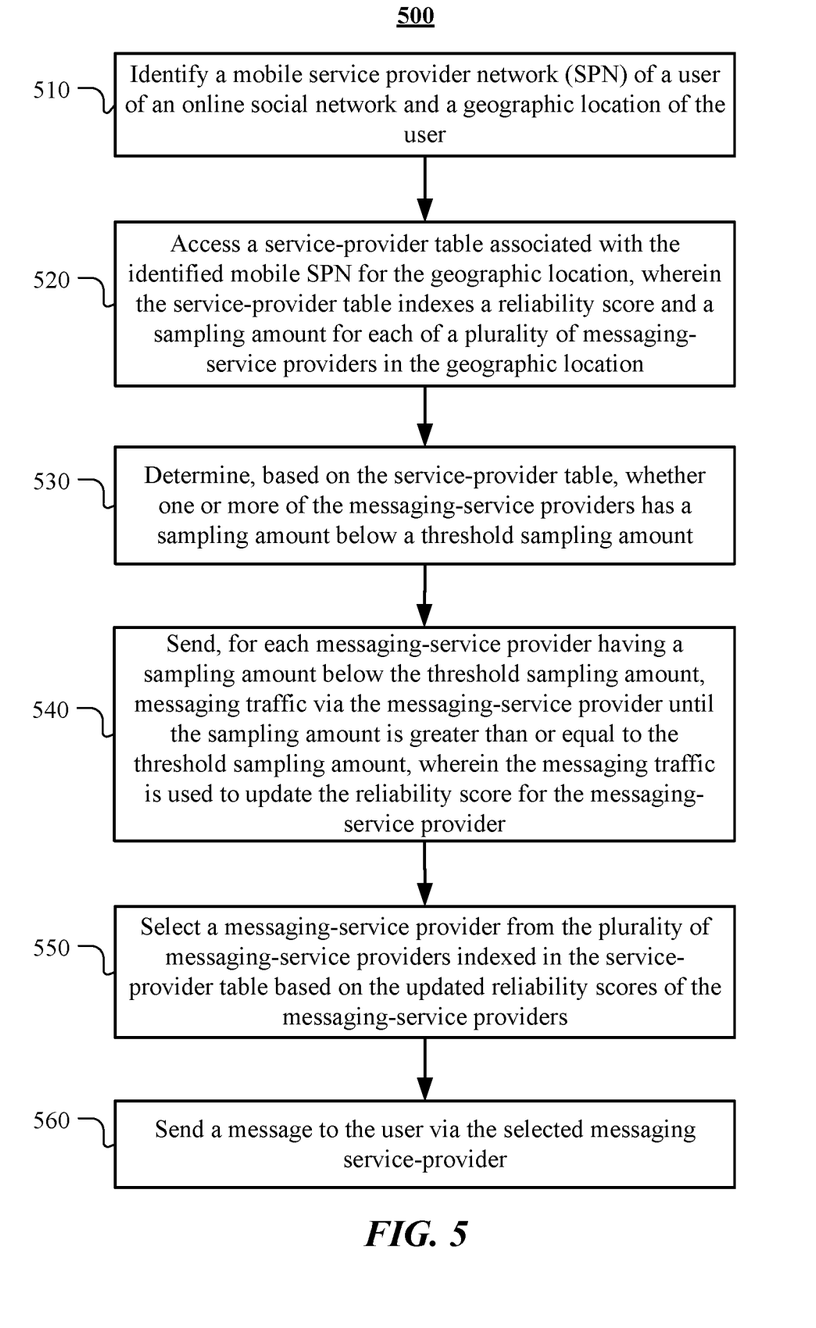
FIG. 5 illustrates an example method for selecting a messaging-service provider for sending messages to a user.

FIG. 5 illustrates an example method 500 for selecting a messaging-service provider for sending messages to a user. The method may begin at step 510, where the social-networking system 160 may identify a mobile service provider network (SPN) of a user of an online social network and a geographic location of the user. At step 520, the social-networking system 160 may access a service-provider table associated with the identified mobile SPN for the geographic location, wherein the service-provider table indexes a reliability score and a sampling amount for each of a plurality of messaging-service providers in the geographic location. At step 530, the social-networking system 160 may determine, based on the service-provider table, whether one or more of the messaging-service providers has a sampling amount below a threshold sampling amount. At step 540, the social-networking system 160 may send, for each messaging-service provider having a sampling amount below the threshold sampling amount, messaging traffic via the messaging-service provider until the sampling amount is greater than or equal to the threshold sampling amount, wherein the messaging traffic is used to update the reliability score for the messaging-service provider. At step 550, the social-networking system 160 may select a messaging-service provider from the plurality of messaging-service providers indexed in the service-provider table based on the updated reliability scores of the messaging-service providers. At step 560, the social-networking system 160 may send a message to the user via the selected messaging service-provider. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for selecting a messaging-service provider for sending messages to a user including the particular steps of the method of FIG. 5, this disclosure contemplates any suitable method for selecting a messaging-service provider for sending messages to a user including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Systems and Methods

Figure 6:
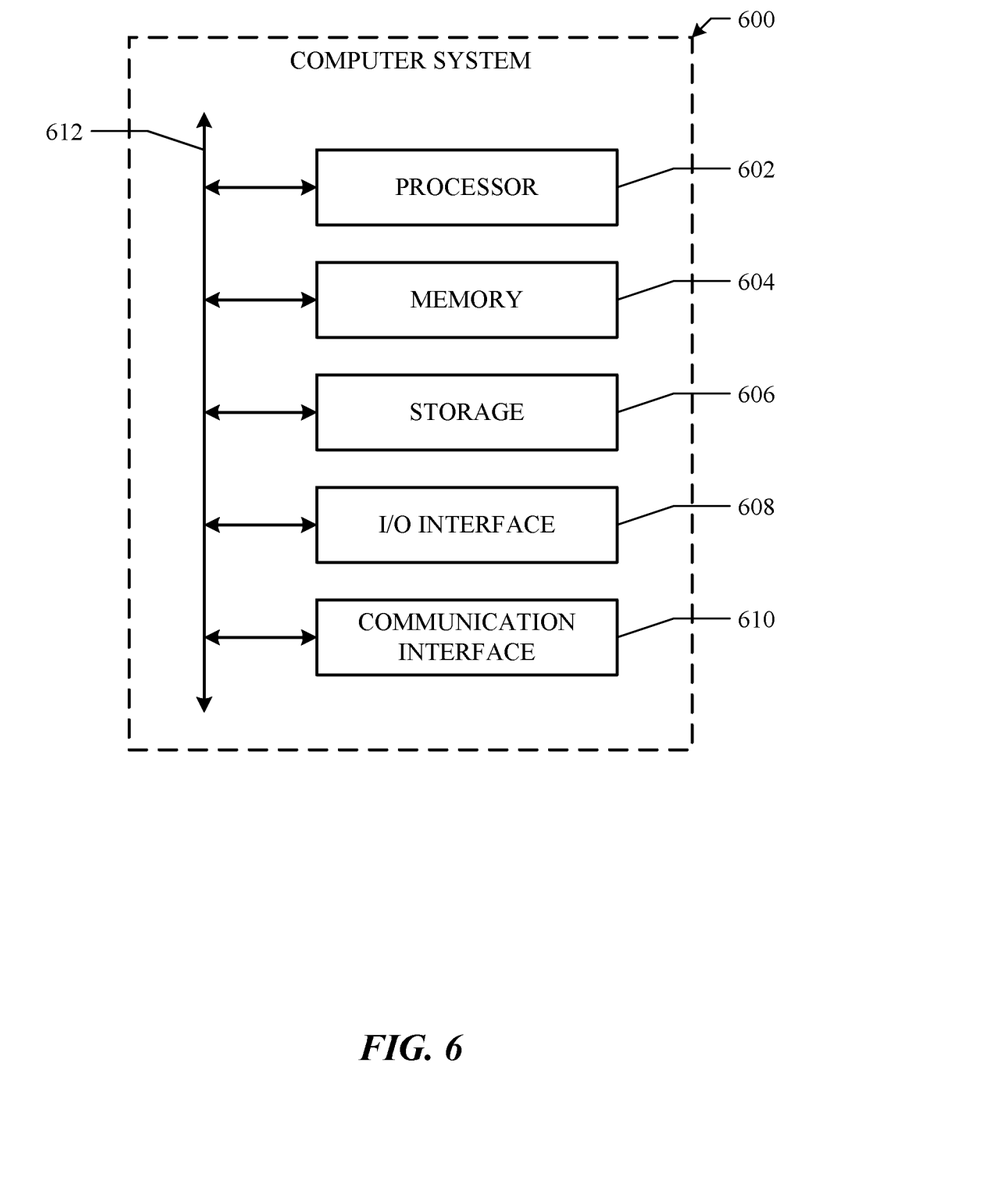
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising, by one or more computing devices:
    identifying a mobile service provider network (SPN) of a user of an online social network and a geographic location of the user;
    accessing a service-provider table associated with the identified mobile SPN for the geographic location, wherein the service-provider table indexes a reliability score and a sampling amount for each of a plurality of messaging-service providers in the geographic location;
    determining, based on the service-provider table, whether one or more of the messaging service providers has a sampling amount in the geographic location below a threshold sampling amount;
    sending, for each messaging-service provider having a sampling amount in the geographic location below the threshold sampling amount, messaging traffic in the geographic location via the messaging-service provider until the sampling amount is at least greater than the threshold sampling amount, wherein the messaging traffic is used to update the reliability score for the messaging-service provider in the geographic location, wherein the threshold sampling amount is a pre-assigned minimum number of messages that need to be sent through the messaging-service provider to yield a sufficiently accurate reliability score, wherein the reliability score is based on a ratio of a number of messages that were successfully delivered to their destinations via the messaging-service provider divided by a total number of messages that were sent via the messaging-service provider;
    selecting a messaging-service provider from the plurality of messaging-service providers indexed in the service-provider table based on the updated reliability scores of the messaging service providers having the sampling amount above the threshold sampling amount, wherein the selected messaging-service provider has a sampling amount above the threshold sampling amount; and
    sending a message to the user via the selected messaging service-provider.

2. The computer-implemented method of claim 1, further comprising:
    accessing a social graph comprising a plurality of nodes and a plurality of edges connecting the nodes, each of the edges between two of the nodes representing a single degree of separation between them; wherein the plurality of nodes comprises:
    a first node corresponding to the user; and
    a plurality of second nodes corresponding to a plurality of other users of the online social network, respectively.

3. The computer-implemented method of claim 1, wherein selecting a messaging-service provider comprises selecting a messaging-service provider with a highest reliability score.

4. The computer-implemented method of claim 1, wherein the sampling amount comprises a number of messages sent through the corresponding messaging service provider since the beginning of a regular interval of time.

5. The computer-implemented method of claim 4, wherein the sampling amount is reset at the end of the regular interval of time.

6. The computer-implemented method of claim 1, further comprising determining that a particular message was successfully delivered when an action responsive to the particular message is detected.

7. The computer-implemented method of claim 1, further comprising determining that a particular message was not successfully delivered when an action responsive to the particular message is not detected before a pre-determined amount of time elapses.

8. The computer-implemented method of claim 7, further comprising based on determining that the particular message was not successfully delivered, resending the particular message via another messaging-service provider from the plurality of messaging-service providers based on the reliability scores of the messaging-service providers.

9. The computer-implemented method of claim 3, further comprising:
determining that the message to the user was not successfully delivered to the user; and
re-sending the message to the user via another messaging-service provider with a next highest reliability score and a sampling amount that is greater than or equal to the threshold sampling amount.

10. The computer-implemented method of claim 1, where selecting the messaging-service provider is further based on costs of sending messages via each of the plurality of messaging-service providers.

11. The computer-implemented method of claim 1, wherein the service-provider table comprises a plurality of tiers, each tier comprising messaging-service providers within a range of costs, wherein the selecting the messaging-service provider further comprises:
assigning a priority to each messaging-search provider of the plurality of messaging service providers, wherein the priority is based on ordering the tiers by ascending cost and ordering the messaging-service providers within each tier by descending reliability score; and
selecting the messaging-service provider with the highest priority.

12. The computer-implemented method of claim 11, further comprising:
determining that the message to the user was not successfully received by the user; and
re-sending the message to the user via another messaging-service provider with a next highest priority.

13. The computer-implemented method of claim 11, further comprising:
periodically updating the reliability score and the cost of each of the plurality of service providers in the service-provider table; and
re-assigning a priority to each of the plurality of service providers in the service-provider table.

14. The computer-implemented method of claim 1, wherein the messaging-service provider comprises a short message service (SMS) gateway provider.

15. The computer-implemented method of claim 1, wherein the message comprises a SMS message, a multimedia messaging service (MMS) message, a push notification, or a voice message.

16. The computer-implemented method of claim 1, wherein the message comprises a request for confirmation of ownership of a device associated with an account of the user on the online social network.

17. The computer-implemented method of claim 16, wherein the request comprises a hyperlink.

18. The computer-implemented method of claim 1, wherein the messaging traffic is test traffic.

19. The computer-implemented method of claim 1, wherein the messaging traffic is actual traffic.

20. One or more computer-readable non-transitory storage media embodying software that is operable when executed to:
identify a mobile service provider network (SPN) of a user of an online social network and a geographic location of the user;
access a service-provider table associated with the identified mobile SPN for the geographic location, wherein the service-provider table indexes a reliability score and a sampling amount for each of a plurality of messaging-service providers in the geographic location;
determine, based on the service-provider table, whether one or more of the messaging service providers has a sampling amount in the geographic location below a threshold sampling amount;
send, for each messaging-service provider having a sampling amount in the geographic location below the threshold sampling amount, messaging traffic in the geographic location via the messaging-service provider until the sampling amount is at least greater than the threshold sampling amount, wherein the messaging traffic is used to update the reliability score for the messaging-service provider in the geographic location, wherein the threshold sampling amount is a pre-assigned minimum number of messages that need to be sent through the messaging-service provider to yield a sufficiently accurate reliability score, wherein the reliability score is based on a ratio of a number of messages that were successfully delivered to their destinations via the messaging-service provider divided by a total number of messages that were sent via the messaging-service provider;
select a messaging-service provider from the plurality of messaging-service providers indexed in the service-provider table based on the updated reliability scores of the messaging service providers having the sampling amount above the threshold sampling amount, wherein the selected messaging-service provider has a sampling amount above the threshold sampling amount; and
sending a message to the user via the selected messaging service-provider.

21. A system comprising: one or more processors; and a non-transitory memory coupled to the processors comprising instructions executable by the processors, the processors operable when executing the instructions to:
identify a mobile service provider network (SPN) of a user of an online social network and a geographic location of the user;
access a service-provider table associated with the identified mobile SPN for the geographic location, wherein the service-provider table indexes a reliability score and a sampling amount for each of a plurality of messaging-service providers in the geographic location;
determine, based on the service-provider table, whether one or more of the messaging service providers has a sampling amount in the geographic location below a threshold sampling amount;
send, for each messaging-service provider having a sampling amount in the geographic location below the threshold sampling amount, messaging traffic in the geographic location via the messaging-service provider until the sampling amount is at least greater than the threshold sampling amount, wherein the messaging traffic is used to update the reliability score for the messaging-service provider in the geographic location, wherein the threshold sampling amount is a pre-assigned minimum number of messages that need to be sent through the messaging-service provider to yield a sufficiently accurate reliability score, wherein the reliability score is based on a ratio of a number of messages that were successfully delivered to their destinations via the messaging-service provider divided by a total number of messages that were sent via the messaging-service provider;

select a messaging-service provider from the plurality of messaging-service providers indexed in the service-provider table based on the updated reliability scores of the messaging service providers having the sampling amount above the threshold sampling amount, wherein the selected messaging-service provider has a sampling amount above the threshold sampling amount; and sending a message to the user via the selected messaging service-provider.

\* \* \* \* \*